United States Patent
Denholm et al.

(10) Patent No.: US 11,151,174 B2
(45) Date of Patent: Oct. 19, 2021

(54) COMPARING KEYWORDS TO DETERMINE THE RELEVANCE OF A LINK IN TEXT

(71) Applicant: INTERNATIONAL BUSINESS MACHINES CORPORATION, Armonk, NY (US)

(72) Inventors: Ashleigh Denholm, Bursledon (GB); Jack Wadsted, Bursledon (GB); Emma J. Dawson, Eastleigh (GB); Eunjin Lee, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 218 days.

(21) Appl. No.: 16/131,069

(22) Filed: Sep. 14, 2018

(65) Prior Publication Data
US 2020/0089803 A1    Mar. 19, 2020

(51) Int. Cl.
| | |
|---|---|
| *G06F 40/20* | (2020.01) |
| *G06F 16/31* | (2019.01) |
| *G06F 16/955* | (2019.01) |
| *G06F 16/95* | (2019.01) |
| *G06F 40/134* | (2020.01) |

(Continued)

(52) U.S. Cl.
CPC ............ *G06F 16/313* (2019.01); *G06F 16/95* (2019.01); *G06F 16/955* (2019.01); *G06F 40/20* (2020.01); *G06F 16/94* (2019.01); *G06F 16/954* (2019.01); *G06F 16/958* (2019.01);
(Continued)

(58) Field of Classification Search
None
See application file for complete search history.

(56) References Cited

U.S. PATENT DOCUMENTS

| | | | | |
|---|---|---|---|---|
| 5,708,825 A | * | 1/1998 | Sotomayor | ........... G06F 40/134 |
| | | | | 715/205 |
| 6,678,673 B1 | * | 1/2004 | Eves | ...................... G06F 16/335 |

(Continued)

OTHER PUBLICATIONS

Bourn, Jennifer "Why Broken Links Are Bad for Business" Dec. 12, 2013; Internet: https://www.bourncreative.com/why-broken-links-are-bad/; 6 pgs.
(Continued)

*Primary Examiner* — Richard Z Zhu
(74) *Attorney, Agent, or Firm* — Cantor Colburn LLP; Teddi Maranzano

(57) ABSTRACT

A method of checking a link in a body of text comprises receiving the text and detecting a link to an external source within the received text. At least a portion of the received text is selected for analysis and one or more important keywords within the selected portion of the received text are determined. Text is obtained from the external source by accessing the link. At least a portion of the obtained text is selected for analysis and one or more important keywords within the selected portion of the obtained text are determined. The more important keywords within the selected portion of the original received text are compared with the important keywords within the selected portion of the obtained text from the link, and an output is provided depending upon the result of the comparison of the one or more important keywords within the selected portion of the received text with the one or more important keywords within the selected portion of the obtained text.

12 Claims, 5 Drawing Sheets

(51) Int. Cl.
  *G06F 16/93* (2019.01)
  *G06F 16/954* (2019.01)
  *G06F 16/958* (2019.01)
(52) U.S. Cl.
  CPC ...... *G06F 16/9558* (2019.01); *G06F 16/9566* (2019.01); *G06F 40/134* (2020.01)

(56) References Cited

U.S. PATENT DOCUMENTS

| | | | | |
|---|---|---|---|---|
| 7,003,719 | B1* | 2/2006 | Rosenoff | G06F 16/9558 715/205 |
| 8,239,461 | B2* | 8/2012 | Jones | G06F 16/951 709/206 |
| 8,661,327 | B1 | 2/2014 | Channakeshava | |
| 9,606,974 | B2 | 3/2017 | Gorelick et al. | |
| 2002/0107735 | A1* | 8/2002 | Henkin | G06Q 30/0255 705/14.55 |
| 2008/0133460 | A1* | 6/2008 | Clark | G06F 16/951 |
| 2008/0275783 | A1* | 11/2008 | Wee | G06Q 30/02 705/14.54 |
| 2011/0119220 | A1* | 5/2011 | Seolas | G06F 16/957 706/47 |
| 2013/0036344 | A1 | 2/2013 | Ahmed et al. | |
| 2015/0012806 | A1* | 1/2015 | Soni | G06F 16/9535 715/205 |
| 2016/0007204 | A1* | 1/2016 | Park | H04L 63/1408 726/23 |
| 2016/0085732 | A1 | 3/2016 | Boehler et al. | |
| 2016/0323107 | A1* | 11/2016 | Bhogal | H04L 9/3247 |

OTHER PUBLICATIONS

Chen, Xiaoyun et al., Abstract "HAWK: A Focused Crawler with Content and Link Analysis", IEEE Xplore Digital Library, Published in: e-Business Engineering, Date Added to IEEE Xplore: Dec. 2, 2008. ICEBE '08. IEEE International Conference on Oct. 22-24, 2008; 2 pgs.

IBM "Security Bulletin: CICS Transaction Gateway for Multiplatforms", URL: https://www-01.ibm.com/support/docview.wss?uid=swg22010235; modified Nov. 2, 2017; 5 pgs.

Kim, Hye-Jin et al., "Efficient Methods for Detecting Spam through Analyzing Tweets", Int'l Journal of Applied Engineering Research, vol. 11, No. 15; 2016, pp. 8448-8451.

Smithson, Andrew "Using policy-based API processing in z/OS Connect EE", URL: https://developer.ibm.com/mainframe/2017/11/13/using-policy-based-api-processing-zos-c . . . ; Published on Nov. 13, 2017; updated on Apr. 13, 2018; 8 pgs.

Watson "Natural Language Understanding", URL: https://natural-language-understanding-demo.ng.bluemix.net/, downloaded Sep. 5, 2018; 2 pgs.

* cited by examiner

COMPARING KEYWORDS TO DETERMINE THE RELEVANCE OF A LINK IN TEXT

BACKGROUND

The present invention relates to a computer implemented method, a data processing system and a computer program product for checking a link in a body of text.

SUMMARY

According to a first aspect of the present invention, there is provided a computer implemented method comprising receiving text, detecting a link to an external source within the received text, selecting at least a portion of the received text for analysis, determining one or more important keywords within the selected portion of the received text, accessing the link to obtain text from the external source, selecting at least a portion of the obtained text for analysis, determining one or more important keywords within the selected portion of the obtained text, comparing the one or more important keywords within the selected portion of the received text with the one or more important keywords within the selected portion of the obtained text, and providing an output depending upon the result of the comparison of the one or more important keywords within the selected portion of the received text with the one or more important keywords within the selected portion of the obtained text.

According to a second aspect of the present invention, there is provided a data processing system comprising a processor arranged to receive text, detect a link to an external source within the received text, select at least a portion of the received text for analysis, determine one or more important keywords within the selected portion of the received text, access the link to obtain text from the external source, select at least a portion of the obtained text for analysis, determine one or more important keywords within the selected portion of the obtained text, compare the one or more important keywords within the selected portion of the received text with the one or more important keywords within the selected portion of the obtained text, and provide an output depending upon the result of the comparison of the one or more important keywords within the selected portion of the received text with the one or more important keywords within the selected portion of the obtained text.

According to a third aspect of the present invention, there is provided a computer program product for controlling a data processing system comprising a processor, the computer program product comprising a computer readable storage medium having program instructions embodied therewith, the program instructions executable by the processor to cause the processor to receive text, detect a link to an external source within the received text, select at least a portion of the received text for analysis, determine one or more important keywords within the selected portion of the received text, access the link to obtain text from the external source, select at least a portion of the obtained text for analysis, determine one or more important keywords within the selected portion of the obtained text, compare the one or more important keywords within the selected portion of the received text with the one or more important keywords within the selected portion of the obtained text, and provide an output depending upon the result of the comparison of the one or more important keywords within the selected portion of the received text with the one or more important keywords within the selected portion of the obtained text.

BRIEF DESCRIPTION OF THE DRAWINGS

Preferred embodiments of the present invention will now be described, by way of example only, with reference to the following drawings, in which.

DETAILED DESCRIPTION

Figure 1:
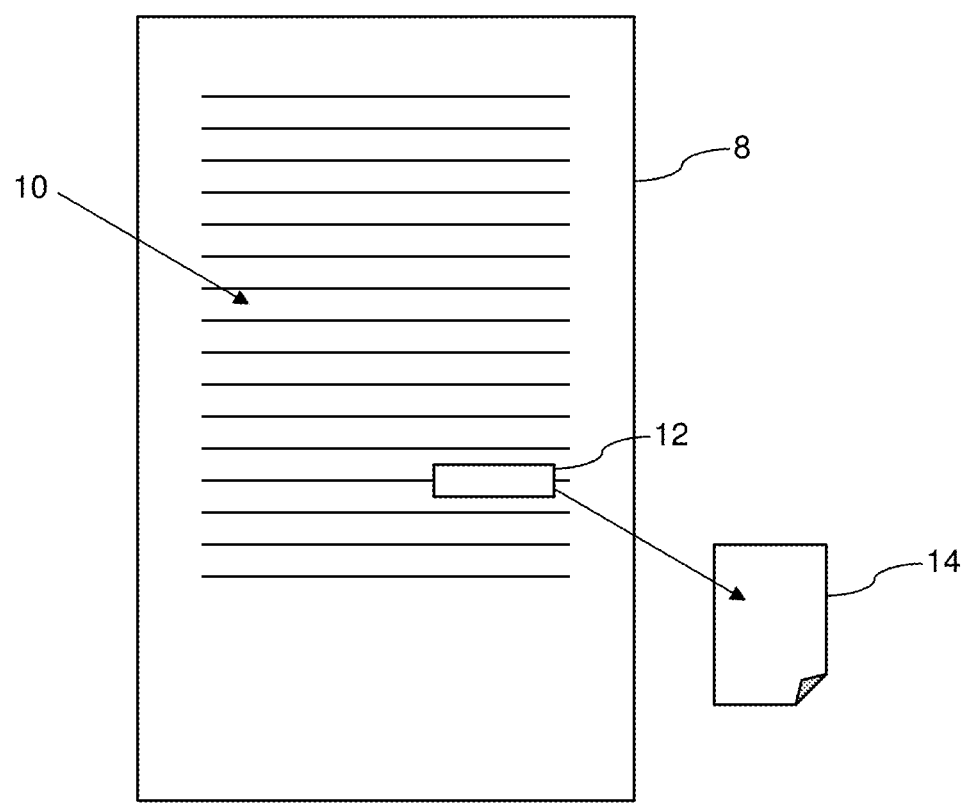
FIG. 1 is a schematic diagram of body of text.

FIG. 1 shows a schematic diagram of a body of text 10 in a document 8. Included within the text is a link 12 to an external source 14. The text 10 shown in FIG. 1 could be one of many different text bodies, such as an article published via a news website on the Internet, or a word processing document being created on a desktop computer or a tweet or instant message being created on a mobile phone and so on. Although only one link 12 is shown in the Figure, multiple links 12 could be present in the text 10. Any person who has access to the text 10 can access the external source 14 via the link 12.

If the text 10 is an article on a news website, then the link 12, once accessed by an end user, will take the user away from the text 10 and to the external source 14. The source 14 is external only in the sense that it is external to the text 10, the link 12 could take the user to another article on the same news website. Equally, the link 12 could take the user to a totally different website, for example to the website of an academic institution. The text 10 could be about house prices for example and the link 12 could take the user to an external resource which includes historic house price data.

Although in general such text and link arrangements work well, it is a known problem that incorrect links can be embodied into text. This can happen in many different ways, usually with the author of the text 10 copying in an incorrect link 12 which is not the link 12 that is intended. Certain automated systems that send out multiple tweets and instant messages can also be incorrectly set up by the original author or user, which can make it relatively for some of the tweets and messages to contain an incorrect link 12. The presence of such an incorrect or broken link is highly undesirable as it can mislead a reader of the text 10 and/or look unprofessional.

A system and method are provided for determining, with a high degree of likelihood, when such a link 12 is not the correct link 12. The method can be carried out in the background as the author is creating the text 10, or can be used once the text 10 and link 12 are complete. In broad terms, the method comprises accessing any text that is present at the external source 14 and comparing that text with the original text 10 to see to what extent the two match. This is because, in general, the subject matter of the external source 14 should match the subject matter of the text 10, since the presence of a link 12 in the text 10 will be assumed to be related to the text 10.

If a match between the two is not detected, as described in more detail below, the system can take action to respond to the detection of a non-match between the text 10 and the link 12. This action might be to provide a warning to the author of the text 10, for example asking them to double check the link 12 before completing the text 10 being created (or before the text 10 is published or sent depending upon the nature of the text 10 being created). Other actions might be to prevent the text 10 from being published or to delete the link 12 from the text 10 and so on depending upon how the system that is monitoring the use of links 12 is configured.

Figure 2:
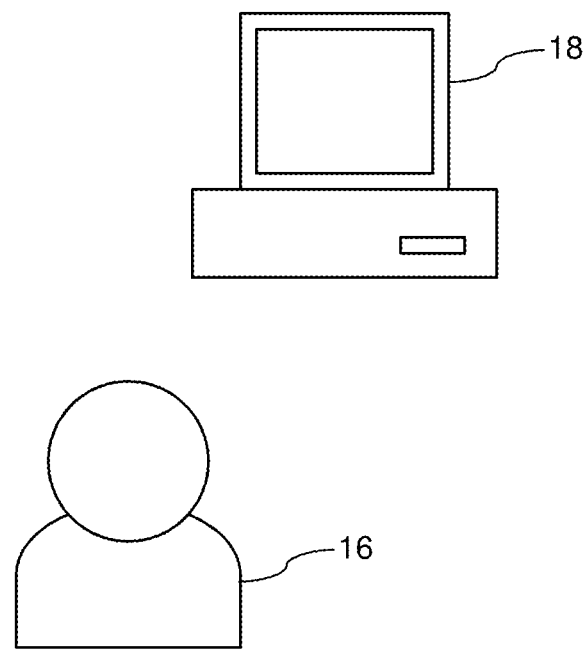
FIG. 2 is a schematic diagram of an author using a computing system.

FIG. 2 shows schematically an author 16 who is using a system 18 to create the text 10, which contains one or more links 12 to one or more external sources 14. Here the system 18 is shown as a desktop computer, but the system 10 can be any device that is able to generate text and embed links in the text, such as a mobile phone or pda etc. The author 16 creates the text 10 and as they do so, the system 18 provides a back-up check on any links 12 that are created in the text 10 (whether directly by the author 16 or by an automated action). The system 18 is able to determine, with a high degree of certainty whether any link 12 included in the text 10 is the correct link 12, given the content of the text 10 that surrounds the link 12.

A preferred embodiment of the operation of the system 18 is now described. The system 18 kicks off when the user 16 adds a link 12 to a bod of text 10 such as a tweet, email or article. The system 18 waits until the user 16 stops editing or adding further text 10 around the link 12, which indicates that the text 10 in the relevant part is in its final form. The system 18 then selects the text area and link 12 to be analyzed, which is a maximum of 100 words before the link 12 and 100 words after the link 12. The system 18 splits up the text area into a TEXT element and a LINK element by using URL detection.

A TEXT analysis is now performed using the 100 words taken from before and after the link 12, giving 200 words in total. In general, when considering word count limits, the difference in natural language keyword relevance is not significant enough to warrant the use of any more words. Therefore 200 words is the optimum amount for the best results, but fewer words can be used, depending upon the nature of the text 10 that contains the link 12 (certain types of short message have word limits under 200). The user can define the number of words that will be used. The system 18 now processes this text 10 using any suitable technique to identify the important keywords in the text 10, such as Natural Language Understanding (NLU), to output keywords, see for example: https://natural-language-understanding-demo.mybluemix.net.

At the same time a LINK analysis is performed by the system 18. Again, the system 18 runs a technique to identify the keywords in the text present at the external resource, for example by using Natural Language Understanding on the URL which outputs important keywords, see https://natural-language-understanding-demo.mybluemix.net. The system 18 then compares the important keywords found within the relevant parts of the TEXT and LINK to calculate the confidence level of relevance of the TEXT and LINK. Any keywords from the NLU processing with a relevance rating under 0.5 are discarded. The important keywords from the TEXT and LINK are then matched to calculate an overall relevance for the link 12 with respect to the text 10.

The table shows examples of keyword matching:

| TEXT keyword | LINK keyword | Reason |
| --- | --- | --- |
| artificial intelligence | artificial intelligence | Match - exact match |
| AI | artificial intelligence | Partial Match - common acronym |
| stamp duty | stamp duty cut | Partial Match - one keyword is contained within the other |
| stamp duty | artificial intelligence | No match - no common words or acronyms |

Three different important keywords have been identified in the text 10, artificial intelligence, AI and stamp duty, while two different important keywords have been identified in the text found at the link 12, artificial intelligence and stamp duty cut. It can be seen from a comparison of the different keywords that there is a single exact match (on artificial intelligence), two partial matches (AI with artificial intelligence and stamp duty with stamp duty cut) and no match on all other combinations.

If a full-match is detected (such as stamp duty=stamp duty), an average relevance (ar) is calculated from the TEXT and LINK relevance scores from NLU (each important keyword is assigned a relevance rating). If a full-match is NOT detected, the average relevance (ar) is calculated from the TEXT and LINK relevance scores from NLU using partial matches (such as stamp duty~stamp duty cut). If more than one match is detected, a total relevance (tr) score is calculated by averaging the ar scores. In summary:

$$ar=(\text{text keyword relevance}+\text{link keyword relevance})/2$$

$$tr=(ar1+ar2+ar3+\ldots)/\text{total number of matches}$$

The system 18 outputs the confidence level (tr) to the user 16. If the confidence level is below a predetermined threshold then a warning can be provided to the user 16 that the link 12 that is present within the text 10 is more than likely not the correct link 12. This gives the user the chance to double check the link 12 that they have included in their text and amend or remove the link 12 as appropriate.

A more detailed example is now outlined, with respect to a tweet (which is the text 10) containing a link 12. The text 10 of the tweet is "In z/OS Connect EE V3.0.3, we've added policy-based API processing that target IMS applications. Find out more in this example:" and the link 12 embedded by the author in the text 10 is: https://developer.ibm.com/mainframe/2017/11/13/using-policy-based-api-proces sing-zos-connect-eel. Since the size of the tweet is fewer than 200 words, then the whole text of the tweet is selected for analysis. The natural language understanding process referred to above is used to determine one or more important keywords within the text 10 which are used as the basis for the matching with the content of the link 12.

The important keywords identified in the text 10 are "z/OS Connect EE", which is given a relevance of 0.97, "policy-based API processing", which is given a relevance of 0.84, "target IMS applications", which is given a relevance of 0.77 and "example", which is given a relevance of 0.22. The same process is also performed on the link 12. The text present at the link 12 is accessed and at least a portion of the text is analyzed. In general all of the text at the link 12 will be accessed and analyzed, however if the text at the link 12 is found to be above a certain large number of words (such as 500, then only a portion of the words found at the link 12 will be used, such as the first 500).

The important keywords identified at the link 12 are "policy-based API processing", which is given a relevance of 1.00, "IMS Connect regions", which is given a relevance of 0.71, "z/OS Connect EE", which is given a relevance of 0.70, "API consumers", which is given a relevance of 0.68, "certain API", which is given a relevance of 0.65, "API definition", which is given a relevance of 0.64, "API request", which is given a relevance of 0.63, "API path", which is given a relevance of 0.62, "API operation", which is given a relevance of 0.61, "API toolkit", which is given a relevance of 0.60 and "HTTP header", which is given a relevance of 0.58.

It can be seen by comparing the two lists of important keywords that there are two matches between the keywords on the two lists. "Policy based API processing" (which can be considered as ar1) has a 92% match, which is calculated as an average from the relevance ratings of 0.84 in the text 10 and 1.00 in the link 12. "z/OS Connect EE" (which can be considered as ar2) has an 83% match, which is calculated as an average from the relevance ratings of 0.97 in the text 10 and 0.70 in the link 12. The total relevance level (tr) is then calculated as an average of the ar values, which gives an overall tr of 87.5%. This is an example where a relatively high overall tr is generated and the link 12 is probably the correct link for the text 10.

However, if a different link 12 were to be imbedded in the same text 10, then a different result of the checking process may well be reached. For example, if the link 12 that was included was not the link 12 detailed above, but instead the link as follows: https://www-01.ibm.com/support/docview.wss?uid=swg22010235, then a different outcome will occur. In relation to the text 10, the determination of one or more important keywords in that text 10 will be the same as in the example above, with the important keywords identified in the text 10 are "z/OS Connect EE", which is given a relevance of 0.97, "policy-based API processing", which is given a relevance of 0.84, "target IMS applications", which is given a relevance of 0.77 and "example", which is given a relevance of 0.22.

Once the process moves on to the step of determining one or more important keywords at the link 12, then a new set of keywords are found, as follows: "Java SE", which is given a relevance of 0.93, "CVSS Base Score", which is given a relevance of 0.85, "Oracle Java SE", which is given a relevance of 0.76, "Java SE embedded", which is given a relevance of 0.67, "unspecified vulnerability", which is given a relevance of 0.53, "unauthenticated attacker", which is given a relevance of 0.49, "Environmental Score", which is given a relevance of 0.46 and "SE embedded JAXP", which is given a relevance of 0.29. Here there are simply no matches between the important keywords of the text 10 and the important keywords of the link 12. The result of this process will be a total relevance (tr) of zero, which would lead to the generation of a flag or warning to the end user.

The total relevance is calculated as an average of the match ratings for each pair of matching keywords between the text 10 and the link 12. This means that if keywords that have high relevance ratings are present in both the text 10 and the text at the link 12 then the final total relevance will be high, indicating that there is a good likelihood that the link 12 that is present within the text 10 is the correct link 12 for that text 10. Different predetermined thresholds can be applied to the final total relevance value. For example if the total relevance is above 75% then no action is taken. If the final relevance is between 50% and 75% then an "amber" warning can be given to the user to indicate that it might be advisable to check the link 12. If the total relevance is less than 50%, then a "red" warning can be given, which prevents the user from posting or sending the text 10 until they have performed specific actions, such as checking the link 12 and verifying that the link 12 is actually the correct link 12 for the text 10 in question.

Figure 3A:
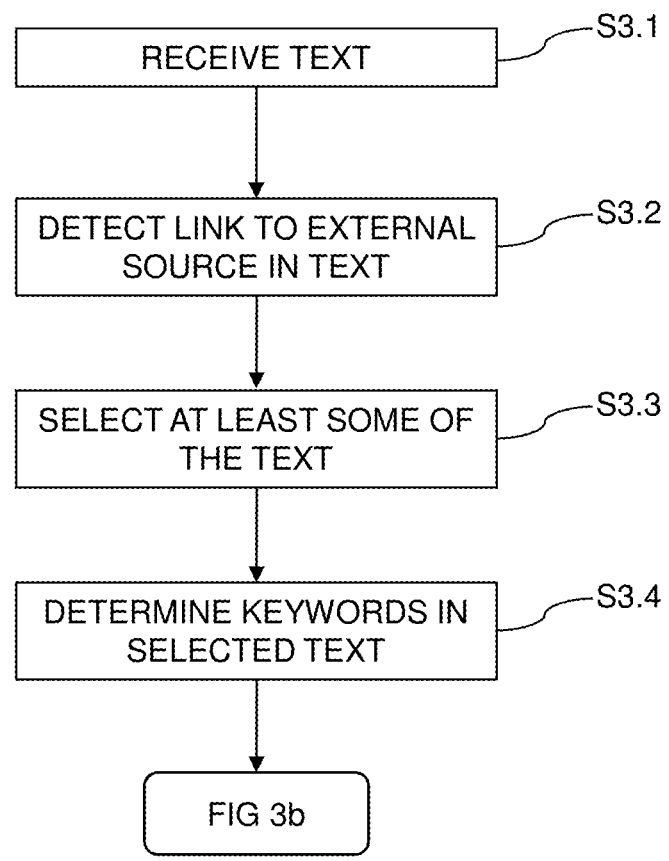
FIGS. 3A and 3B are flowcharts of a method of checking a link in text.
Figure 3B:
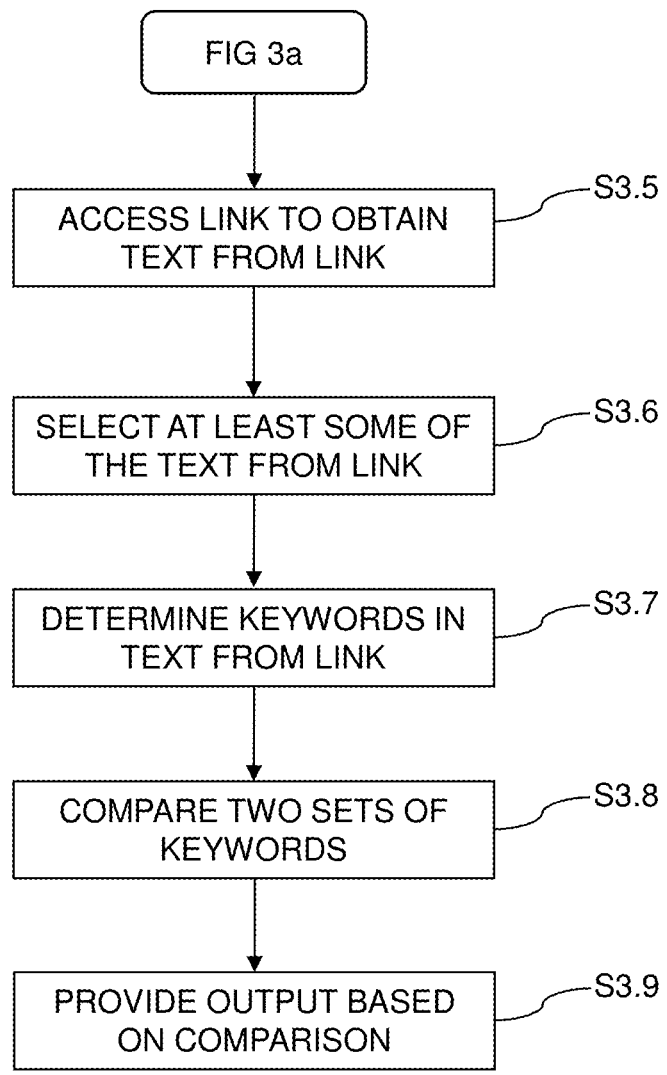

FIGS. 3A and 3B are flowcharts of the checking process, which is carried out by the system 18 in order to check that a link 12 is actually correct within a specific text 10. The method first comprises step S3.1, which comprises receiving text 10 and the second step of the method is step S3.2, which comprises detecting a link 12 to an external source 14 within the received text 10. The system 18, which is carrying out the link checking is either continually monitoring the text 10 as it is being created by the author, or performs the process of FIG. 3 in response to a specific action or attempted action by the author, such as the author saving an electronic document containing the text 10 and link 12 or the publication/transmitting of the text 10 (in the case of a tweet or instant message).

The next stage of the method is step S3.3, which comprises selecting at least a portion of the received text 10 for analysis and step S3.4, which comprises determining one or more important keywords within the selected portion of the received text 10. Preferably, the step S3.3 of selecting at least a portion of the received text 10 for analysis comprises selecting a predetermined number of words surrounding the link 12 to an external source 14 within the received text 10. The predetermined number of words could be 200 words for example, with 100 words either side of the link 12 being selected.

The next step of the method is step S3.5, which comprises accessing the link 12 to obtain text from the external source 14. The next stage of the process is step S3.6, which comprises selecting at least a portion of the obtained text for analysis and step S3.7, which comprises determining one or more important keywords within the selected portion of the obtained text. As detailed above, the system 18 will go through the link 12 to obtain text that is present at the link 12. At least a portion of this text is then selected (which may be all of the text found at the link 12). The selected text of the link 12 is then analyses to determine the important keywords in the text at the link 12.

The penultimate step of the method is step S3.8, which comprises comparing the one or more important keywords within the selected portion of the received text 10 with the one or more important keywords within the selected portion of the obtained text from the link 12, and the final step of the method is step S3.9, which comprises providing an output depending upon the result of the comparison of the one or more important keywords within the selected portion of the received text 10 with the one or more important keywords within the selected portion of the obtained text of the link 12. In this way the user can be informed if there is not a sufficient match between the text 10 and the content of the link 12, which indicates that the link 12 may not be the correct link 12 for the text 10 in question.

Ideally, the steps S3.4 and S3.7 of determining one or more important keywords within the selected portion of the received text 10 and the obtained text from the link 12 comprise assigning a relevance rating to each determined keyword. Preferably, the step S3.9 of providing an output depending upon the result of the comparison of the one or more important keywords within the selected portion of the received text 10 with the one or more important keywords within the selected portion of the obtained text from the link 12 comprises generating a matching percentage from the relevance rating of the or each important keywords present in both the selected portion of the received text and the selected portion of the obtained text. A matching percentage can be generated that can be used as the basis for deciding whether the user should be warned about the link 12 within the text 10. The user can be presented with a warning if the generated matching percentage is below a predetermined level.

Figure 4:
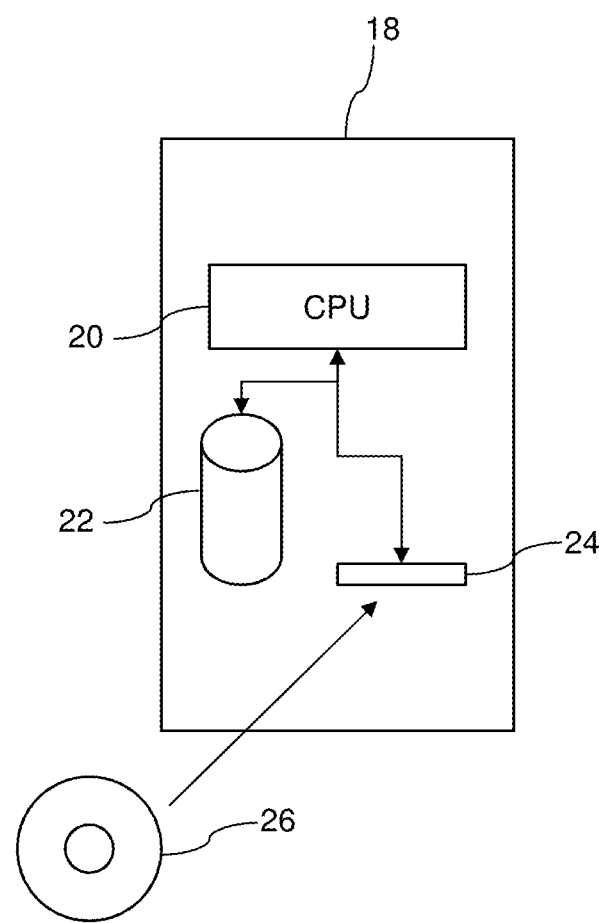
FIG. 4 is a schematic diagram of a data processing system.

The checking process shown in FIG. 3 is preferably carried out by a data processing system 18 which has access to the text 10. FIG. 4 shows one embodiment of a data processing system 18. The system 18 comprises a processor 20 that is controlling the operation of the data processing system 18. The processor 20 of the data processing system 18 is also connected to a local storage device 22 and to a local interface 24. A computer readable storage medium 26 is provided, which is a CD-ROM 26 storing a computer program product that can be used to control the processor 20 to operate the data processing system 18. The processor 20 executes instructions from the computer program product to operate the data processing system 22.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method comprising:
receiving text from a user,
detecting a link to an external source within the received text, wherein the external source is a website,
selecting at least a portion of the received text for analysis, wherein the portion includes a predetermined number of words surrounding the link,
determining one or more important keywords within the selected portion of the received text,
accessing the link to obtain text from the external source,
selecting at least a portion of the obtained text for analysis,
determining one or more important keywords within the selected portion of the obtained text,
comparing the one or more important keywords within the selected portion of the received text with the one or more important keywords within the selected portion of the obtained text to generate a matching percentage for the one or more important keywords within the selected portion of the received text with the one or more important keywords within the selected portion of the obtained text, and
providing an output depending upon the result of the comparison of the one or more important keywords within the selected portion of the received text with the one or more important keywords within the selected portion of the obtained text, wherein the output includes a warning to the user to check the link because the link is not a correct link based on a determination that the generated matching percentage is below a predetermined level,
wherein the warning prevents the user from at least one of posting and sending the text until the user verifies that the link is correct.

2. A method according to claim 1, wherein the step of selecting at least a portion of the received text for analysis comprises selecting a predetermined number of words surrounding the link to an external source within the received text.

3. A method according to claim 1, wherein the steps of determining one or more important keywords within the selected portion of the received text and the obtained text comprise assigning a relevance rating to each determined keyword.

4. A method according to claim 3, wherein the matching percentage is generated from the relevance rating of the or each important keywords present in both the selected portion of the received text and the selected portion of the obtained text.

5. A data processing system comprising a processor arranged to:
receive text, from a user
detect a link to an external source within the received text, wherein the external source is a website,
select at least a portion of the received text for analysis, wherein the portion includes a predetermined number of words surrounding the link,
determine one or more important keywords within the selected portion of the received text,
access the link to obtain text from the external source,
select at least a portion of the obtained text for analysis,
determine one or more important keywords within the selected portion of the obtained text,
compare the one or more important keywords within the selected portion of the received text with the one or more important keywords within the selected portion of the obtained text to generate a matching percentage for the one or more important keywords within the selected portion of the received text with the one or more important keywords within the selected portion of the obtained text, and
provide an output depending upon the result of the comparison of the one or more important keywords within the selected portion of the received text with the one or more important keywords within the selected portion of the obtained text, wherein the output includes a warning to the user to check the link because the link is not a correct link based on a determination that the generated matching percentage is below a predetermined level,
wherein the warning prevents the user from at least one of posting and sending the text until the user verifies that the link is correct.

6. A system according to claim 5, wherein the processor is arranged, when selecting at least a portion of the received text for analysis, to select a predetermined number of words surrounding the link to an external source within the received text.

7. A system according to claim 5, wherein the processor is arranged, when determining one or more important keywords within the selected portion of the received text and the obtained text, to assign a relevance rating to each determined keyword.

8. A system according to claim 7, wherein the matching percentage is generated from the relevance rating of the or each important keywords present in both the selected portion of the received text and the selected portion of the obtained text.

9. A computer program product for controlling a data processing system comprising a processor, the computer program product comprising a computer readable storage medium having program instructions embodied therewith, the program instructions executable by the processor to cause the processor to,
receive text from a user,
detect a link to an external source within the received text, wherein the external source is a website,
select at least a portion of the received text for analysis, wherein the portion includes a predetermined number of words surrounding the link,
determine one or more important keywords within the selected portion of the obtained text,
compare the one or more important keywords within the selected portion of the received text with the one or more important keywords within the selected portion of the obtained text to generate a matching percentage for the one or more important keywords within the selected portion of the received text with the one or more important keywords within the selected portion of the obtained text, and provide an output depending upon the result of the comparison of the one or more important keywords within the selected portion of the received text with the one or more important keywords within the selected portion of the obtained text, wherein the output includes a warning to the user to check the link because the link is not a correct link based on a determination that the generated matching percentage is below a predetermined level, wherein the warning prevents the user from at least one of posting and sending the text until the user verifies that the link is correct.

10. A computer program product according to claim 9, wherein the instructions for selecting at least a portion of the received text for analysis comprise instructions for selecting a predetermined number of words surrounding the link to an external source within the received text.

11. A computer program product according to claim 9, wherein the instructions for determining one or more important keywords within the selected portion of the received text and the obtained text comprise instructions for assigning a relevance rating to each determined keyword.

12. A computer program product according to claim 11, wherein the matching percentage is generated from the relevance rating of the or each important keywords present in both the selected portion of the received text and the selected portion of the obtained text.

\* \* \* \* \*